May 15, 1934.  O. U. ZERK  1,959,256
CUSHIONING ELEMENT AND METHOD OF MAKING SAME
Original Filed Oct. 24, 1930
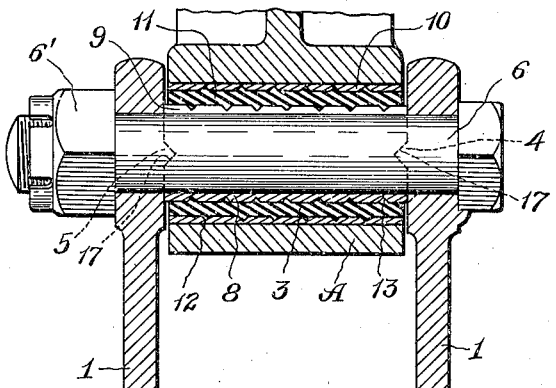
FIG. 1.
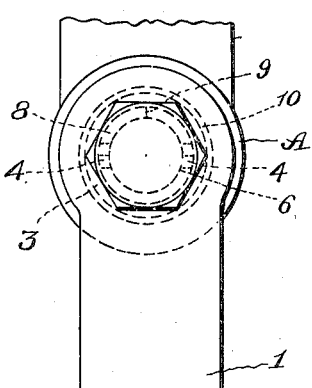
FIG. 2.
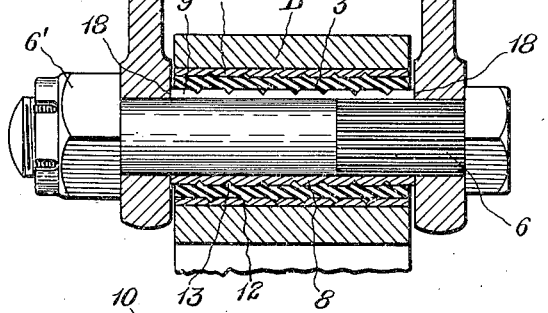
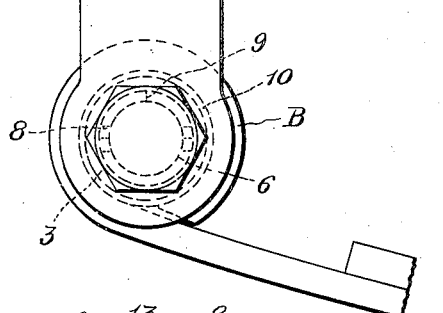
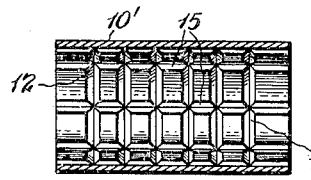
FIG. 3.
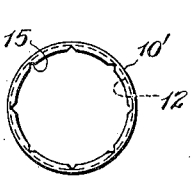
FIG. 4.
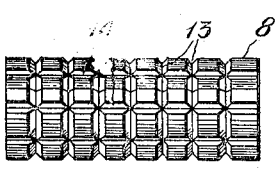
FIG. 5.
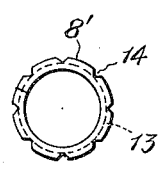
FIG. 6.
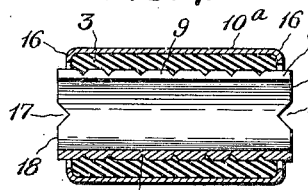
FIG. 7. FIG. 8.
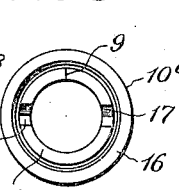
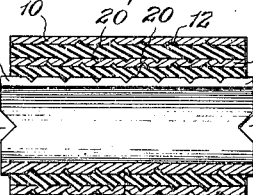
FIG. 9. FIG. 10.
FIG. 11. FIG. 12. FIG. 13.
INVENTOR.
Oscar U. Zerk
BY
Hough & Canfield
ATTORNEYS.

Patented May 15, 1934

1,959,256

UNITED STATES PATENT OFFICE 1,959,256

CUSHIONING ELEMENT AND METHOD OF MAKING SAME

Oscar U. Zerk, Cleveland, Ohio

Original application October 24, 1930, Serial No. 490,905. Divided and this application November 25, 1931, Serial No. 577,311

19 Claims. (Cl. 267—54)

My invention relates to cushioning elements in general, and more particularly to the multi-tubular type of rubber bushings consisting of concentrically telescoped metal tubes having tubes of rubber or other suitable elastic or resilient material interposed therebetween.

This general type of bushing has been well known for many years, and has been used for the purpose of entirely eliminating lubricant of the so-called swivel bearing, having movement of limited angularity, as for instance, shackle bearings, coupling bearings, and other of the various bearings used in an automobile, by inserting the rubber bushing between the male and the female members of the bearing.

In some of the first rubber bushings made the rubber was vulcanized to the two metal tubes. However, aside from the expense connected with this method, other objectional features were noted: first, lateral movement or "shimmying" of the two metal tubes in the direction of the axis when in use; second, relatively quick rotting of the rubber because it is normally not under pressure over all of its circumference; and third, the difficulty of vulcanizing rubber to ordinary steel tubing. Hence, this method was not a practical one.

An object of my invention is to provide as an article of manufacture an improved resilient bushing.

Another object of my invention is to provide an improved rubber bushing element of that type involving relatively telescoped tubes with an inherently resilient tube interposed between them.

Another object of my invention is to provide as an article of manufacture an improved rubber bushing element comprising at least several relatively telescoped tubes of relatively rigid material which are maintained in relatively spaced relation by interposed tubes of relatively resilient material, each of the resilient tubes being compressed between adjacent pairs of the relatively rigid tubes.

Another object of my invention is to provide an improved cushioning element adapted to be employed to absorb the shocks and the torsional and longitudinal strains of mechanical linkages such as the shackle bolt link connections between a spring and supporting portions of an automobile vehicle.

Another object of my invention is to provide such a cushioning element as an article of manufacture comprising in combination with an internal bolt a superposed split metal tube fitted thereon, a rubber bushing telescoped over the split metal tube, and an outer tube telescoped over the rubber tube.

Another object of my invention is to provide such a cushioning element as an article of manufacture comprising in combination with an internal bolt a superposed split metal tube fitted thereon, a rubber bushing telescoped over the split metal tube, and an outer tube telescoped over the rubber tube, and shackle hanger elements to which the bolt is secured at either end, said shackle hanger element being interlocked with one of the metal tubes.

Another object of my invention is to provide an improved joint between a leaf spring and an article to be supported thereby comprising an eye end portion of the spring, a tube forced into the said eye, a rubber tube telescoped within the outer tube and a split inner metal tube, telescoped within the rubber tube and a bolt forced tightly within the bore of the split inner tube.

Another object of my invention is to provide in a multi-tubular bushing element having an intermediate inherently resilient tube, an inner metallic tube therefor so constructed that it will yield radially to a slight degree to permit the forcing of a bolt through the bore of the bushing.

Another object of my invention is to provide in a multi-tubular bushing element having an intermediate inherently resilient tube, an inner metallic tube therefor, which is split longitudinally whereby it may be slightly expanded against the inherent resiliency of the rubber superposed over it, when a shackle bolt or the like is forced through its bore in intimate contact with its inner wall.

Another object of my invention is to provide as an article of manufacture, an improved cushioning element comprising in combination with an internal bolt, a relatively thick split inner metal tube telescoped thereon, a rubber tube telescoped on the inner tube, and a relatively thin outer metal tube which is not split telescoped over the rubber tube.

Another object of my invention is to provide an improved rubber bushing element having inner and outer relatively telescoped metallic tubular elements, each adapted to be affixed to separate elements of a mechanism, with an interposed compressed layer of rubber between the elements, which will possess improved qualities over similar bushing elements previously used.

Another object of my invention is to provide an improved resilient bushing comprising inwardly directed depressions on the outside surface of the inner metal tube.

Another object of my invention is to provide an improved resilient bushing comprising outwardly directed depressions on the inside surface of the outer metal tube.

Another object of my invention is to provide an improved resilient bushing comprising depressions in either of the metal tubes either in a circular or a longitudinal direction, or in both directions.

Another object of my invention is to substantially effect the prevention of relative longitudinal movement of the tubes of an improved resilient bushing by turning or bending one of the rigid tubes at its ends in the direction of the other tube, thus embracing the resilient tube.

Another object of my invention is to effect greater relative angularity of movement of the two relatively telescoped tubes of the resilient bushing of my invention, employing rubber therebetween, by using three or more telescoping rigid tubes and two or more rubber tubes, one interposed between each adjacent pair of rigid tubes.

Another object of my invention is to effect the prevention of relative movement between an inner metal tube of the resilient bushing of my invention when employed in a shackle or like member, and the bolt of said shackle.

Another object of my invention is to provide for the use, in an improved resilient bushing, of an inner metal tube formed of bent sheet metal which is not welded or brazed together, this type of tube being relatively inexpensive as compared to the type of tube requiring welding or brazing.

Another object of my invention is to provide in a shackle or other like member, employing an improved resilient bushing of my invention, outstanding lugs forged in the sides of the shackle or other like member, which interlock with depressions formed in the ends of the inner metal tube of the resilient bushing of my invention, to prevent relative movement of the tube and the shackle member, (or vice versa).

Another object of my invention is to provide an improved cushioning element of the above type, preferably, where a rubber tube is compressed between an outside and an inside metal tube, an inner metal tube which is made of a bent sheet metal where the seam is not rigidly closed by being welded or brazed, thus permitting the inside metal tube to expand slightly, when in the case of adverse limits, a bolt of larger outside diameter than the inside diameter of the inner metal tube is driven into the inner metal tube. This expansion of the inner metal tube is made possible by the resilient yielding of the rubber tube which is interposed between the outside and the inner metal tube.

Referring to the figures of drawing:

Fig. 1 is a medial sectional view of a shackle employing an assembled rubber bushing of my invention;

Fig. 2 is a side elevational view of Fig. 1;

Fig. 3 is a longitudinal medial sectional view of an outer metal tube of my invention having circular grooves on its inner surface;

Fig. 4 is an end view of the tube of Fig. 3;

Fig. 5 is an elevational view of a split inner metal tube of my invention having circular grooves on its outer surface;

Fig. 6 is an end view of the tube of Fig. 5;

Fig. 7 is a view similar to Fig. 3 of an outer metal tube having longitudinal grooves as well as the circular grooves shown in Fig. 3;

Fig. 8 is an end view of Fig. 7;

Fig. 9 is a view similar to Fig. 5 of an inner metal tube having longitudinal grooves as well as the circular grooves shown in Fig. 5;

Fig. 10 is an end view of Fig. 9;

Fig. 11 is a sectional view of an embodiment of my invention;

Fig. 12 is an end view of Fig. 11; and

Fig. 13 is a sectional view of an embodiment of my invention.

Referring now to all of the figures of drawing in all of which like parts are designated by like reference characters, and referring first to the embodiment of my invention illustrated in Figs. 1 to 6, inclusive, I show therein a shackle mechanism for automobile springs adapted to resiliently interconnect the shackle hanger with the eye of a vehicle spring, in such a way that the parts of the mechanism may perform their usual functions without necessity of lubrication of any of the parts and without the annoying attending undesirable "rattles" being effected. The shackle, per se, comprises a pair of spaced parallel preferably like hanger arms 1 with shackle bolts 6 extending through aligned openings in the thickened ends of the shackle arms, nuts 6' being provided on the threaded ends of the bolts to secure the arms together by said bolts.

It will be understood that the form of the shackle mechanism per se is not of the essence of my invention, since many widely different shackle mechanisms may be employed therewith, my invention pertaining chiefly to shackle mechanism of any suitable type in combination with the improved form of multi-tubular resilient cushioning element illustrated in the drawing.

In the drawing, I show in combination with the shackle mechanism per se of Figs. 1 and 2, two multi-tubular cushioning elements, each of these comprising an inner relatively thick metallic tube 8 which is provided with a longitudinal seam 9 and an outer preferably seamless tube 10 having a preferably thinner wall, with an interposed tubular body 11 of rubber or like resilient material held under heavy compressive stress by the opposing outer and inner walls of the tubes 8 and 10, respectively. Any suitable method of placing the inner tube and the intermediate rubber tube and the outer metal tube in relatively telescoped relation, may be employed, such as for instance that method shown in the Powell Patent No. 1,552,645, dated September 8, 1925, my present invention being independent of any particular method of assembling the multi-tubular element.

My present invention resolves chiefly around the provision in such a multi-tubular element of a seamed inner tube 8, whose walls are preferably thicker than the seamless outer tube 10. The opposing walls of the two tubes are preferably roughened or grooved in any suitable manner such as for instance by the provision of annular grooves 12 on the inner wall of the tube 10 or annular grooves 13 on the outer wall of the seamed tube 8, or in any other suitable manner as by longitudinal grooves 15 in combination with the annular grooves 12 as shown in the outer tube 10' of Fig. 7, which illustrates a variant form of outer tube and/or the same method of grooving the outer surface of a variant form of inner tube shown in Figs. 9 and 10, for a tube 8' having both longitudinal grooves 14 and annular grooves 13 like those of Fig. 5.

In assembling the tubular rubber element 3 between the tubes 8 and 10, the thickness of wall of the rubber tube must be sufficient, so that when the three tubes are relatively telescoped the intermediate rubber tube will be placed under heavy radially directed compression by the opposing inner and outer tubes. Portions of the rubber material thus put under compression will be forced into the annular grooves 12 and 13 of the outer and inner tubes, and into longitudinal grooves 14 and 15 of the inner and outer tubes, or into any depressions occurring on the opposing surfaces of either or both of these tubes.

Figs. 11 and 12 illustrate an embodiment of multi-tubular element of the type previously described, wherein I preferably provide the outer tube 10a with inturned ends 16, which serve to restrain the compressed rubber material 3 from flowing longitudinally along the longer inner metallic tube 8.

I contemplate sometimes outturning the inner tube 8 as by providing a radial flange at the ends thereof, or sometimes inturning the outer tube and also inturning the inner tube so long as the ends of said tubes do not actually engage. The provision of rubber embracing end portions on the inner and/or outer tubes also tends to increase the frictional contact between the metal tubes and the rubber tube.

By making the inner metal tube with a longitudinal seam, it can be manufactured much more inexpensively than can a seamless tube, and the tube employing a seam can be used for the inner tube, since the only effect of the very considerable retractive force of the rubber exerting pressure against the inner tube would be to tend to close the seam even more tightly.

It is obvious that unless the wall of the outer tube were quite thick, the outer tube should preferably be of seamless construction.

In practice, I preferably provide the inner tubes, such as 8, Fig. 11, with end notches 17 and the inner tube being made longer than the outer metallic tube 10 10' and 10a, the end edges 18 of the inner tube will engage the inner surfaces of the shackle arms 1 when a pair of the multi-tubular elements, being telescoped within the eyes of a shackle hanger A and of a leaf spring eye B, the shackle mechanism is assembled to cooperate with said hanger and spring eye as by assembling the shackle arms 1 with the bolts 6 in the manner illustrated in the drawing. Under such conditions, the shackle arms may be provided with projections, 5, Fig. 1, adapted to fit into the notches 17 of the ends 18 of the inner metallic tubes 8, to prevent relative rotation of the inner tubes relative to the bolts 6 and the engaged surfaces of the shackle arms 1.

When so positioned and the nut 6' are turned tightly onto the threaded end of the bolts, the interposed inner tubes 8 of the multi-tubular elements serve as spacers to maintain the shackle arms in proper spaced relation and out of contact with the other parts of the multi-tubular element, such as the rubber tube 20 and the outer metallic tube 10 and also out of contact with the sides of the hanger A and the spring eye B.

In the embodiment of my invention illustrated in Fig. 13, I show therein a multi-tubular element generally of the type previously described, but further improved in that an intermediate metal tube 19 is interposed between successively relatively telescoped inner and outer rubber tubes 20 and 20' respectively, which in turn are held in compression between the outer surfaces of the inner tube 8 and of the outer tube 10.

In the manner illustrated, I may provide alternate layers of rubber and metallic material to provide a more resilient cushioning element which may yield to torsional strains exerted between the inner tube 8 and the outer tube 10, respectively, non-rotatably secured each to a separate element of mechanism, such as the bolt 6 and the spring eye B, which in themselves are relatively rotatable through a slight angle of rotation when the parts are used in practice.

I find that the provision of such an intermediate tube resists longitudinal displacement of the inner and outer metallic tubes to a greater degree than if the same aggregate thickness of rubber were used in a single body between said single and outer tubes.

Referring now generally to the different figures of drawing, the outer tube 10 of the multi-tubular element may be made in any suitable way such as by cutting it from a seamless tube of the desired size, by rolling a thicker walled outer tube to the proper thickness, or by rolling a ribbon of sheet metal of the proper thickness to tubular form and then welding the abutting edges thereof together to provide the seamless construction in an inexpensive manner.

It is much more economical to provide a welded tube as described where the wall is thin than where the tubular walls are thicker and I, therefore, effect an economy in my present construction by employing a thin walled tube preferably of seamless construction accomplished preferably by welding the abutting edges of a previously formed seamed tube. When a bolt such as the shackle bolt 6 is driven into the bore of the inner tube 8, as illustrated in Fig. 1, and this inner tube is provided with a longitudinal seam as illustrated in connection with the uppermost multi-tubular cushioning element of Fig. 1, a tight fit may be had between the outer surface of the bolt 6 and the inner surface of the inner tube 8, and the split tube construction will permit expansion of the inner tube to a slight degree thus permitting the bolt to be telescoped within the inner tube and at all times effecting a tight fit even though in the commercial manufacture of these articles variations within commercial limits in the diametrical dimensions of the bolt and tube may occur.

The combination of the inner seamed tube of relative large wall thickness with the outer tube 10 of seamless construction but which has a relatively thin wall, enables the best results to be secured from the use of these tubes at minimum expense. Should the tube 8 be slightly opened by reason of use of an over-sized bolt such as 6 no injury will be done, though a certain amount of the rubber from the tube 9 will be forced into the space provided by the seam, but this will perform the advantageous function of supplementing the frictional contact of the rubber with the outer surface of the inner tube, by a positive interlock of such of the rubber material as is projected within the same.

Prior to my invention, shackle bearings of the lubricated type for automotive vehicles have sometimes been constructed with at least one of the pair of the relatively rotatable bearing bushings provided with a longitudinal seam. However, in such a case the advantage related above was not achieved since the two bearing bushings are required to make a very close fit to establish bearing contact between their surfaces, and the outer tubular bearing will therefore prevent sufficient expansion of the inner tube, even should the inner tube be split because of the large extreme limits encountered in the commercial production of the bearing bolts and the bearing bushings which, as above stated, commonly amounts to as much as .040 of an inch.

A distinct difference therefore exists between the former type of bearings employing split bushings and my present type of cushioning elements adapted for substitution thereof, since in the first, the open seam sheet metal bushing is substantially non-yieldable or non-expansible because the said split bearing bushings are surrounded by non-yielding annuli of metal, while in my present construction the seamed metal bushing is readily expansible because it is surrounded by readily yieldable rubber.

In the use of my invention I contemplate the use of an inner tube which is radially expansible in combination with bolts either of diameters less than or greater than the normal inside diameter of the inner metal tube.

In the foregoing and in my claims I have in most instances referred to the intermediate bushing as composed of rubber. It is to be understood, however, that the application of my invention is not to be limited to the employment of rubber. Other solid materials having the fluent, resilient properties desirable to adapt them to the uses herein contemplated and to the processes and mechanisms herein set forth may be employed within the scope and spirit of my invention.

And it is to be particularly understood that the word "rubber" or any derivatives thereof employed in the claims hereof is to be taken as meaning rubber or any other material having those properties of rubber which are desirable in the application and practice of my invention.

The present application is a division of my co-pending application, Serial No. 490,905, filed October 24, 1930.

Having thus described my invention in certain embodiments I am aware that numerous and extensive departures may be made from the embodiments herein illustrated and described, but without departing from the spirit of my invention.

I claim:

1. A cushioning element, comprising a rubber tube, a substantially seamless metal outer tube and an inner metal tube longitudinally split from end to end telescoped over and within said rubber tube respectively the inner tube being diametrically expanded and exerting radially directed compressive stress on the rubber tube, and a bolt compressing it to less than normal wall thickness telescoped within the inner tube and non-rotatably fixed relatively thereto.

2. A cushioning element, comprising a rubber tube, a substantially seamless metal outer tube and an inner metal tube longitudinally split from end to end telescoped over and within said rubber tube respectively the inner tube being diametrically expanded and exerting radially directed compressive stress on the rubber tube, compressing it to less than normal wall thickness said inner tube having substantially thicker walls than the relatively thinner outer tube, and a bolt telescoped within the inner tube and non-rotatably fixed relatively thereto.

3. In a spring shackle mechanism, in combination with a pair of laterally spaced shackles, a shackle bolt, and the eye of a leaf spring, a tubular cushioning element fitted tightly within the leaf spring eye comprising a rubber tube, a substantially seamless metal outer tube and a longitudinally seamed diametrically expensible inner metal tube telescoped over and within said rubber tube respectively and exerting radially directed compressive stress on the rubber tube, said bolt extending through the said inner tube and fixed thereto in non-rotative relation therewith, and compressing said shackles tightly thereagainst, to restrain rotation of said bolt and shackles relative to said inner tube, and to properly space said shackles.

4. In a spring shackle mechanism, in combination with a pair of laterally spaced shackles, a shackle bolt, and the eye of a leaf spring, of a tubular cushioning element fitted tightly within the leaf spring eye comprising a rubber tube, a substantially seamless metal outer tube and a substantially longitudinally seamed diametrically expansible inner metal tube telescoped over and within said rubber tube respectively and exerting radially directed compressive stress on the rubber tube, said inner tube having substantially thicker walls than the relatively thinner outer tube, said bolt being of larger diameter than the normal inside diameter of said seamed inner tube and forcibly projected through the said inner tube and compressing said shackles tightly thereagainst, to restrain rotation of said bolt and shackles relative to said inner tube, and to properly space said shackles.

5. In a spring shackle mechanism, in combination with a pair of laterally spaced shackles, a shackle bolt, and the eye of a leaf spring, of a tubular cushioning element fitted tightly within the leaf spring eye comprising a rubber tube, a substantially seamless metal outer tube and a substantially longitudinally seamed diametrically expansible inner metal tube, which is longer than said outer tube, telescoped over and within said rubber tube respectively and exerting radially directed compressive stress on the rubber tube, said bolt being of larger diameter than the normal inside diameter of said seamed inner tube and forcibly projected through the said inner tube and compressing said shackles tightly thereagainst, to restrain rotation of said bolt and shackles relative to said inner tube, and to properly space said shackles.

6. In a shackle bearing construction, a pair of bearings and a pair of shackle hangers, the bearings comprising each a bolt element disposed in aligned perforations in the hangers and connecting them, an inner tubular metal bushing expansively forceably telescoped on the bolt, a resilient bushing telescoped on the inner metallic bushing, and a second tubular metallic bushing telescoped on the resilient bushing, the inner bushing being provided with a longitudinal seam, said bolt being of larger outside diameter than the normal inside diameter of the seamed inner tube and exerting expanding stress thereon.

7. A cushioning element, comprising a rubber tube, a substantially seamless metal outer tube and a diametrically expansible inner metal tube telescoped over and within said rubber tube respectively and exerting radially directed compressive stress on the rubber tube, said inner tube having substantially thicker walls than the relatively thinner outer tube, and generally longitudinally split from end to end said bolt being of larger outside diameter than the normal inside diameter of the inner tube and exerting expanding stress thereon substantially uniform from end to end.

8. A cushioning element, comprising a rubber tube, a substantially seamless metal outer tube, a diametrically expansible inner metal tube split from end to end telescoped over and within said rubber tube respectively and exerting radially directed compressive stress on the rubber tube, a vehicle leaf spring eye tightly fitted over said outer tube, a bolt forceably expansively projected through the inner tube and expanding the inner tube and compressing the wall of the rubber tube to less than normal thickness and a pair of shackles for connecting said cushioning element by said bolt to the frame of an automotive vehicle, said inner tube and said bolt being substantially relatively non-rotatable.

9. A cushioning element, comprising a rubber tube, a substantially seamless metal outer tube, a diametrically expansible inner metal tube split from end to end telescoped over and within said rubber tube respectively and exerting radially directed compressive stress on the rubber tube, a vehicle leaf spring eye tightly fitted over said outer tube, a bolt forceably expansively projected through the inner tube and expanding the inner tube and compressing the wall of the rubber tube to less than normal thickness and a hanger for connecting said cushioning element by said bolt to the frame of an automotive vehicle, said inner tube and said bolt being substantially relatively non-rotatable.

10. In combination with the leaf spring of an automotive vehicle and the frame thereof, a hanger secured to the frame comprising a pair of hanger arms, a spring eye adapted for projection between said hanger arms, a cushioning element interposed between said arms and said eye, and telescoped within said eye, said cushioning element comprising a pair of relatively telescoped spaced metal tubes and an intermediate rubber tube, said rubber tube engaging both said metal tubes, the inner of said metal tubes being radially expansile, and a bolt bridging the hanger arms forceably expansively projected through said inner metal tube, said bolt and inner tube being substantially relatively non-rotatable, said inner tube being substantially non-contractible.

11. In a cushioning element, a metallic inner tue, a tube of rubber or like resilient material telescoped over the inner tube, a second metallic tube telescoped over the resilient tube, and having inwardly turned ends, the inner tube being split substantially longitudinally from end to end and a bolt element forceably telescoped into the inner tube in non-rotative relation thereto, expanding it and compressing the wall of the resilient tube to less than normal thickness between the two metal tubes.

12. In a cushioning element, a metallic inner tube, a tube of rubber or like resilient material telescoped over the inner tube, a second metallic tube telescoped over the resilient tube, and having inwardly turned ends, the inner tube being split substantially longitudinally from end to end and a bolt element forceably telescoped into the inner tube in non-rotative relation thereto, expanding it and compressing the wall of the resilient tube to less than normal thickness between the two metal tubes, substantially uniformly from end to end.

13. In a cushioning element, a metallic inner tube, a tube of rubber or like resilient material telescoped over the said inner tube, a second metallic non-split tube of thinner wall thickness than that of the inner tube, telescoped over the resilient tube, and having inwardly turned ends, the inner tube being split substantially longitudinally from end to end, and a bolt element forceably telescoped into the inner tube in non-rotative relation thereto, expanding it and compressing the wall of the resilient tube to less than normal thickness between the two metal tubes.

14. In a cushioning element, a metallic inner tube, a tube of rubber or like resilient material telescoped over the inner tube, a second metallic tube telescoped over the resilient tube, the inner tube being split substantially longitudinally from end to end and a bolt element forceably telescoped into the inner tube in non-rotative relation thereto, expanding it and compressing the wall of the resilient tube to less than normal thickness between the two metal tubes.

15. In a cushioning element, a metallic inner tube, a tube of rubber or like resilient material telescoped over the inner tube, a second metallic tube telescoped over the resilient tube, the inner tube being split substantially longitudinally from end to end and a bolt element forceably telescoped into the inner tube in non-rotative relation thereto, expanding it and compressing the wall of the resilient tube to less than normal thickness between the two metal tubes, and one of the metal tubes having end portions extending over a portion of the ends of the resilient tube.

16. In a cushioning element for leaf springs, in combination with the eye of a spring end, a metallic inner tube, a tube of rubber or like resilient material telescoped over the inner tube, a second metallic tube telescoped over the resilient tube, the outer tube telescoped within the spring eye, the inner tube being split substantially longitudinally from end to end and a bolt element forceably telescoped into the inner tube in non-rotative relation thereto, expanding it and compressing the wall of the resilient tube to less than normal thickness between the two metal tubes.

17. In a cushioning element for leaf springs, in combination with the eye of a spring end, a metallic inner tube, a tube of rubber or like resilient material telescoped over the inner tube, a second metallic tube telescoped over the resilient tube, the outer tube telescoped within the spring eye, the inner tube being split substantially longitudinally from end to end and a bolt element forceably telescoped into the inner tube in non-rotative relation thereto, expanding it and compressing the wall of the resilient tube to less than normal thickness between the two metal tubes, and one of the metal tubes at the ends thereof embracing a portion of the ends of the rubber tube.

18. In a cushioning element, a metallic inner tube, a tube of rubber or like resilient material telescoped over the said inner tube, a second metallic tube telescoped over the resilient tube, the inner tube being split substantially longitudinally from end to end and one of the tubes having a depression open toward the adjacent wall of the rubber tube, and a bolt element forceably telescoped into the inner tube in non-rotative relation thereto, expanding it and compressing the wall of the rubber tube into the depression.

19. In a cushioning element, a metallic inner tube, a tube of rubber or like resilient material telescoped over the inner tube, a second metallic tube telescoped over the resilient tube, the inner tube being split substantially longitudinally from end to end and a bolt element forceably telescoped into the inner tube in non-rotative relation thereto, expanding it and compressing the wall of the resilient tube to less than normal thickness between the two metal tubes, and the metal tubes having each a longitudinal and a circumferential groove in the wall thereof into which the rubber or the like is compressibly forced.

OSCAR U. ZERK.